US012780538B2

(12) United States Patent
Matsuo

(10) Patent No.: US 12,780,538 B2
(45) Date of Patent: Nov. 3, 2026

(54) TRANSPORT SYSTEM AND METHOD FOR CONSTRUCTING TRANSPORT SYSTEM

(71) Applicant: DAIFUKU CO., LTD., Osaka (JP)

(72) Inventor: Yasunobu Matsuo, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 248 days.

(21) Appl. No.: 18/746,261

(22) Filed: Jun. 18, 2024

(65) Prior Publication Data

US 2024/0425275 A1 Dec. 26, 2024

(30) Foreign Application Priority Data

Jun. 23, 2023 (JP) ................................ 2023-103644

(51) Int. Cl.
*B65G 1/04* (2006.01)
*B66F 9/07* (2006.01)

(52) U.S. Cl.
CPC ............ *B65G 1/0407* (2013.01); *B66F 9/072* (2013.01)

(58) Field of Classification Search
CPC .. B65G 1/0407; B65G 1/1373; B65G 1/1375; B65G 63/004; B66F 9/072; B66F 9/0755; B66F 9/07
USPC .......................................................... 414/281
See application file for complete search history.

(56) References Cited

U.S. PATENT DOCUMENTS

| | | | | |
|---|---|---|---|---|
| 3,786,929 A * | 1/1974 | Hathcock, Jr. | ....... | B65G 1/0421 414/281 |
| 4,286,911 A * | 9/1981 | Benjamin | ............ | B65G 1/0414 191/1 R |
| 7,381,022 B1 * | 6/2008 | King | .................... | B65G 1/1375 414/807 |
| 2010/0104405 A1 * | 4/2010 | Amada | ..................... | B66F 9/07 414/281 |
| 2011/0203876 A1 * | 8/2011 | Skinner | ..................... | B66F 9/07 187/240 |
| 2016/0289001 A1 | 10/2016 | Shibata et al. | | |

FOREIGN PATENT DOCUMENTS

| | | | | |
|---|---|---|---|---|
| CN | 103158981 A | 6/2013 | | |
| JP | 02-057899 U | 4/1990 | | |
| JP | H07-025425 A | 1/1995 | | |
| JP | 2001-39508 A | 2/2001 | | |
| JP | 2002-155577 A | 5/2002 | | |
| JP | 2010247662 A * | 11/2010 | | |
| JP | 2013-124174 A | 6/2013 | | |
| KR | 102840919 B1 * | 7/2025 | ............ | B66F 9/0755 |

* cited by examiner

*Primary Examiner* — Sameh Tawfik
(74) *Attorney, Agent, or Firm* — Harness, Dickey & Pierce, P.L.C.

(57) ABSTRACT

It is possible to easily carry out construction of an upper rail. A transport system is configured to include: a lower rail that allows a transport device to travel thereon; an upper rail that guides the transport device; a beam part that is spanned between a pair of storage shelves installed on corresponding opposite sides of the lower rail; and an attachment part, the beam part having a groove portion that allows a fastening member to be engaged therewith and that extends in a longitudinal direction, the upper rail being supported by the beam part when the attachment part is fastened and secured to the beam part with the fastening member.

5 Claims, 8 Drawing Sheets

TRANSPORT SYSTEM AND METHOD FOR CONSTRUCTING TRANSPORT SYSTEM

This Nonprovisional application claims priority under 35 U.S.C. § 119 on Patent Application No. 2023-103644 filed in Japan on Jun. 23, 2023, the entire contents of which are hereby incorporated by reference.

TECHNICAL FIELD

The present invention relates to a transport system and a method for constructing a transport system.

BACKGROUND ART

There has been known a transport system using a stacker crane that travels between storage shelves which are juxtaposed to each other. A track on which the stacker crane moves is constituted by a lower rail, laid on a floor, for allowing wheels which are provided at a carriage part of the stacker crane to roll and an upper rail for guiding a guide roller which is provided at a top end of the stacker crane. The upper rail is mounted to a beam-like member which is spanned between the storage shelves so as to straddle the track.

CITATION LIST

Patent Literature

[Patent Literature 1]
Japanese Patent Application Publication Tokukaihei No. 7-25425

SUMMARY OF INVENTION

Technical Problem

In such a transport system, it is necessary that the upper rail be accurately aligned and constructed in relation to the lower rail. In view of this point, it is desired to realize a transport system that enables construction of the upper rail to be carried out more easily.

Solution to Problem

In order to solve the above problem, a transport system in accordance with an aspect of the present disclosure is configured to include: a lower rail for allowing a transport device for transporting an article to travel thereon; an upper rail for guiding the transport device at a position higher than the lower rail; a pair of storage shelves, installed on corresponding opposite sides of the lower rail, for storing the article; a beam part being spanned between the pair of storage shelves; and an attachment part for coupling the upper rail and the beam part to each other, the beam part having a groove portion that allows a fastening member to be engaged therewith and that extends in a longitudinal direction, the upper rail being supported by the beam part when the attachment part is fastened and secured to the beam part with the fastening member.

In order to solve the above problem, a method for constructing a transport system in accordance with an aspect of the present disclosure is configured to be a method for constructing a transport system, the transport system including: a lower rail for allowing a transport device for transporting an article to travel thereon; an upper rail for guiding the transport device at a position higher than the lower rail; a pair of storage shelves, installed on corresponding opposite sides of the lower rail, for storing the article; a beam part being spanned between the pair of storage shelves; and an attachment part for coupling the upper rail and the beam part to each other, the beam part having a groove portion that allows a fastening member to be engaged therewith and that extends in a longitudinal direction, the upper rail being supported by the beam part when the attachment part is fastened and secured to the beam part with the fastening member, the method including: a first step of laying the lower rail; and a second step of mounting the upper rail, the second step including a sub-step of adjusting the position of the upper rail in relation to the lower rail that has been laid in the first step by moving the attachment part secured to the upper rail in the longitudinal direction of the beam part in a state in which the attachment part is loosely fastened to the beam part with the fastening member engaged with the groove portion.

Advantageous Effects of Invention

According to an aspect of the present disclosure, it is possible to realize a transport system that enables construction of an upper rail accurately aligned in relation to a lower rail to be carried out more easily.

BRIEF DESCRIPTION OF DRAWINGS

FIG. 4 illustrates a cross section of the upper rail.

FIG. 5 illustrates a cross section of a beam part.

FIG. 9 illustrates a state in which the alignment jig is installed on a lower rail, and the laser marking device is placed on the alignment jig.

FIG. 12 illustrates a state in which the position of the upper rail is being adjusted.

FIG. 13 illustrates a state in which the position of the upper rail has been properly adjusted.

DESCRIPTION OF EMBODIMENTS

Embodiments

<Overview of Transport System>

Figure 1:
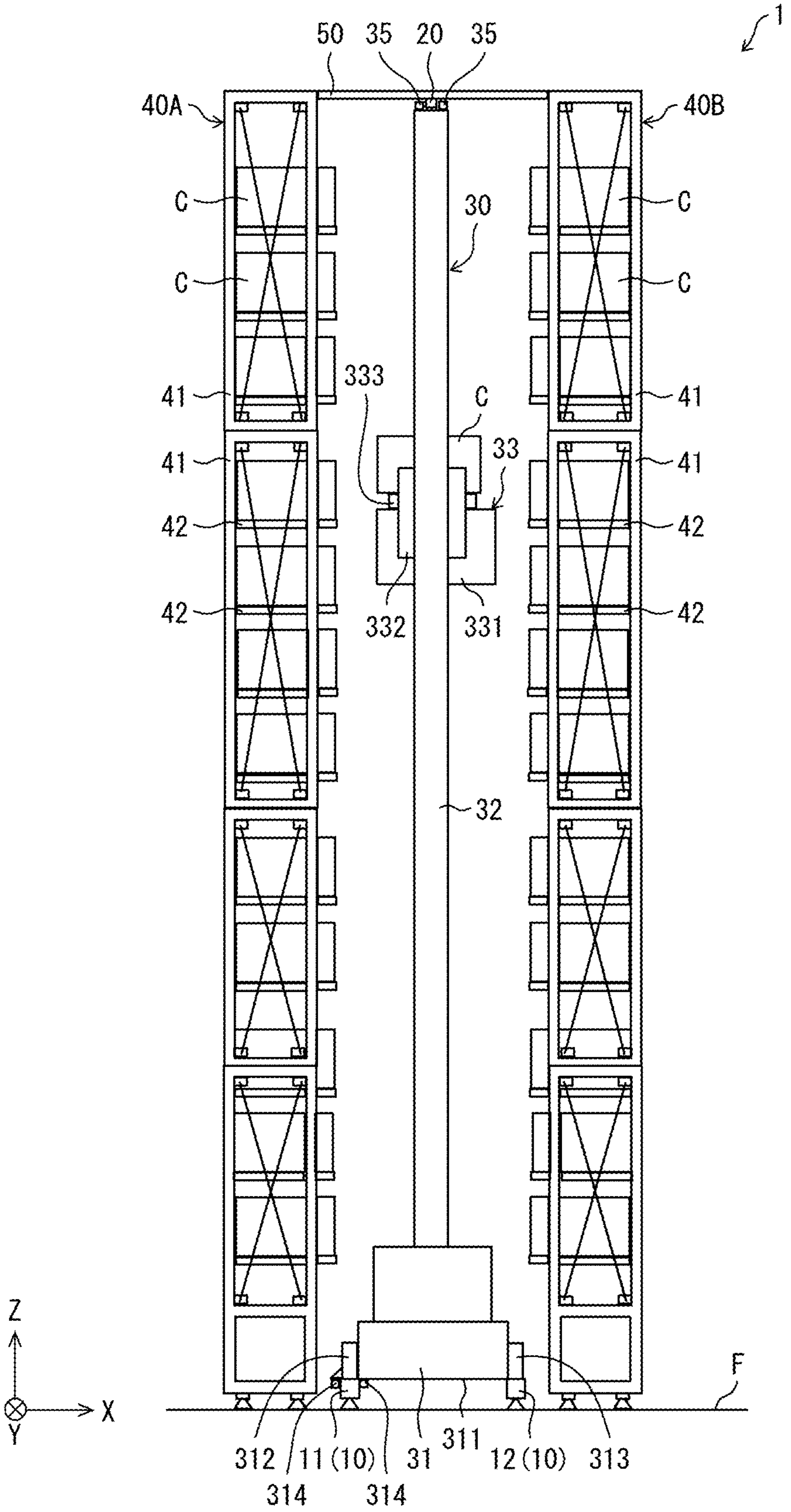
FIG. 1 is a side view illustrating a transport system in accordance with an embodiment of the present disclosure.
Figure 2:
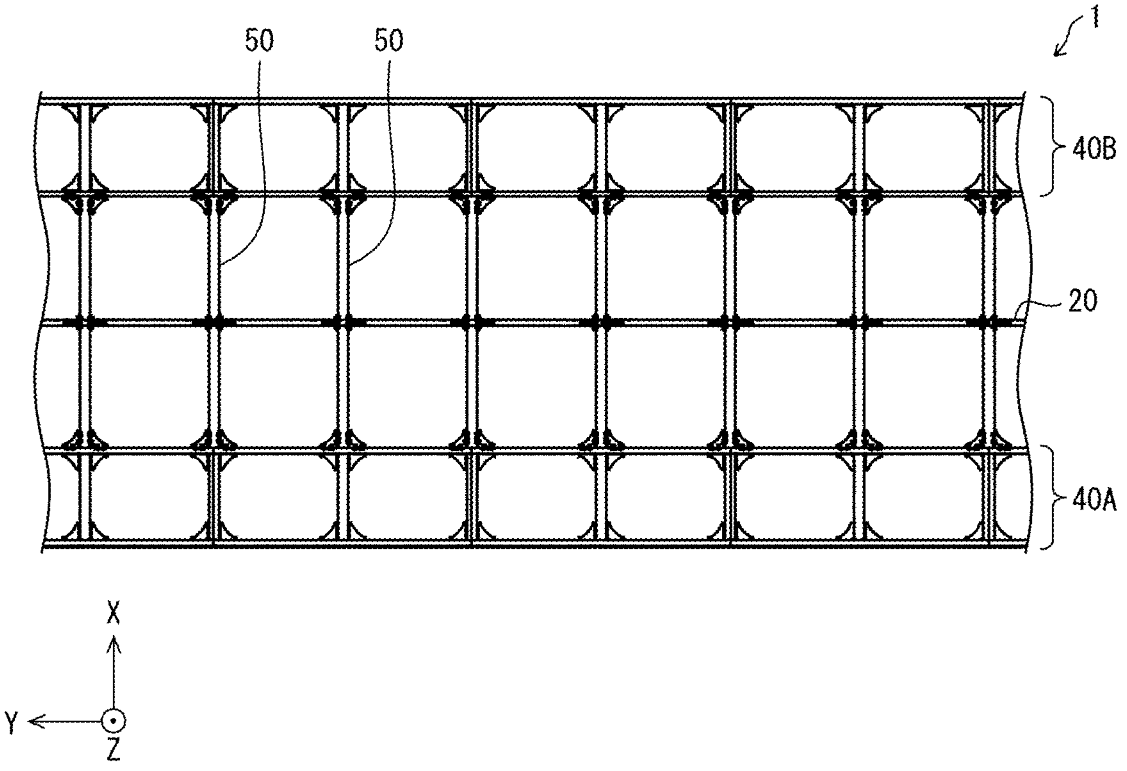
FIG. 2 is a plan view illustrating the transport system in accordance with an embodiment of the present disclosure.
Figure 3:
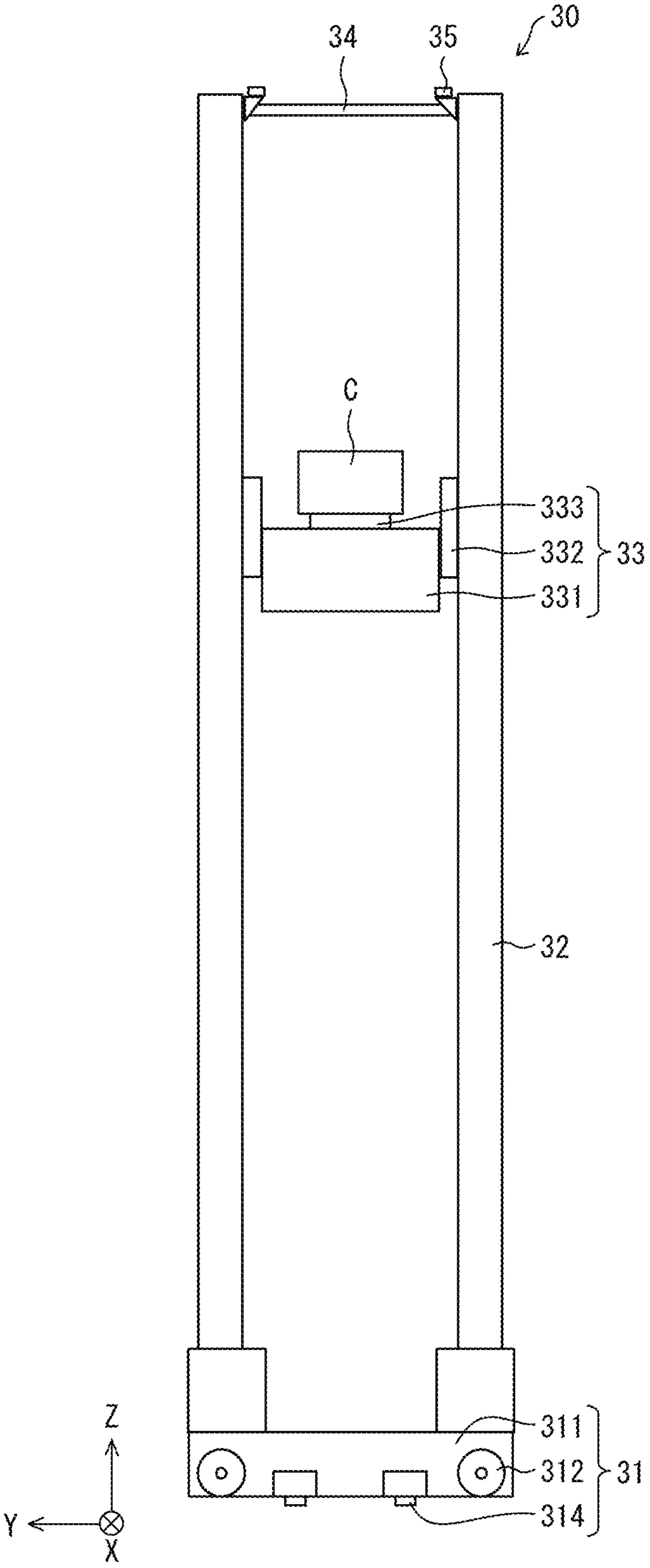
FIG. 3 is an elevation view illustrating a transport device in the transport system in accordance with an embodiment of the present disclosure.

The following will describe an embodiment of the present disclosure with reference to the drawings. FIG. 1 is a side view (right side view) illustrating a transport system 1 in accordance with an embodiment. FIG. 2 is a plan view schematically illustrating the transport system 1 and illustrates only a principal part of the transport system 1 at or near the top of the transport system 1. FIG. 3 is an elevation view illustrating a stacker crane 30 that is a transport device for articles C in the transport system 1.

The transport system 1 includes: the stacker crane 30 that transports the articles C; a lower rail 10 (travel rail) for allowing the stacker crane 30 to travel thereon; and an upper rail 20 (guide rail) that guides the stacker crane 30 at a position higher than the lower rail 10. The transport system 1 includes, on corresponding opposite sides of the lower rail 10 in an extending direction of the lower rail 10, a storage shelf 40A and a storage shelf 40B that store the articles C transported by the stacker crane 30.

As illustrated in the drawings in the present application, an XYZ coordinate system is defined so that a Z-axis is a vertical direction, an X-Y plane is a horizontal plane, and a Y-axis is parallel to the extending direction of the lower rail 10 which is also a traveling direction of the stacker crane 30. Thus, an X-axis direction is a direction orthogonal to the traveling direction of the stacker crane 30 and the extending direction of the lower rail 10. In the present application, in relation to the traveling direction of the stacker crane 30, a positive direction of the Y-axis is referred to as forward direction, a negative direction of the Y-axis is also referred to as backward direction, a side in a positive direction of the X-axis is also referred to as a right side, and a side in a negative direction of the X-axis is also referred to as a left side. An upward Z-axis direction is an upward vertical direction.

Regarding the drawings in the present application, a drawing as a target object is viewed in a positive X-axis direction is referred to as an elevation view, and a drawing as a target object is viewed in a positive Y-axis direction is referred to as a right side view. The right side view is an example of a side view. Further, a drawing as a target object is viewed in a negative Z-axis direction (downward vertical direction) is referred to as a plan view, and a drawing as a target object is viewed in a positive Z-axis direction (upward vertical direction) is referred to as a bottom view.

<Storage Shelves>

Among storage shelves installed on corresponding opposite sides of the lower rail 10 in the extending direction of the lower rail 10, a storage shelf 40A is a storage shelf installed on the left side of the lower rail 10, and a storage shelf 40B is a storage shelf installed on the right side of the lower rail 10.

The storage shelves 40A and 40B are each constituted by frames 41 and shelf stages 42 which are provided in a plurality of tiers in a height direction. The article C is placed on the shelf stage 42 secured to the frame 41 so that the article C is housed in the storage shelf 40A or the like. With respect to each of the shelf stages 42 of the storage shelf 40A installed on the left side of the lower rail 10 and each of the shelf stages 42 of the storage shelf 40B installed on the right side of the lower rail 10, the article C can be loaded or unloaded by the stacker crane 30.

<Track of Stacker Crane>

A track on which the stacker crane 30 moves is constituted by the lower rail 10 and an upper rail 20. In the present embodiment, the lower rail 10 is constituted by a left-side lower rail 11 and a right-side lower rail 12 that are installed in parallel with each other. The left-side lower rail 11 and the right-side lower rail 12 are each linearly laid on a floor F of a factory, a warehouse, or the like in which the transport system 1 is installed.

The upper rail 20 is parallel to the left-side lower rail 11 and the right-side lower rail 12 and is installed at a position higher than the left-side lower rail 11 and the right-side lower rail 12. In the present embodiment, it is assumed that the upper rail 20 is located midway between the left-side lower rail 11 and the right-side lower rail 12 in plan view, that is, as viewed in the vertical direction. However, the position of the upper rail 20 in relation to the left-side lower rail 11 and the right-side lower rail 12 is not necessarily limited to a position located midway between the left-side lower rail 11 and the right-side lower rail 12.

A plurality of beam parts 50 (beams, horizontal members) are spanned between the storage shelves 40A and 40B that are installed on the corresponding opposite sides of the lower rail 10 in the extending direction of the lower rail 10. The beam parts 50 are each a member in the shape of a column and are disposed so as to extend in the X-axis direction. That is, the extending direction of the beam parts 50 is orthogonal to the traveling direction of the stacker crane 30 and the extending direction of the lower rail 10. The beam parts 50 are secured to the storage shelf 40A and the storage shelf 40B with appropriate coupling members at the respective uppermost portions of the storage shelf 40A and the storage shelf 40B. The upper rail 20 is disposed at the position described above by being supported by the plurality of beam parts 50.

<Stacker Crane>

The stacker crane 30 is a transport device that travels along the track described above and transports the article C which serves as an object to be transported. The stacker crane 30 includes, as a principal part, a traveling vehicle 31, a pair of masts 32, and a raising and lowering section 33.

A vehicle frame 311 of the traveling vehicle 31 supports wheels that roll on the lower rail 10. The wheels of the traveling vehicle 31 are constituted by a pair of left-side wheels 312 each of which is provided at the front and rear of the traveling vehicle 31 and a pair of right-side wheels 313 each of which is provided at the front and rear of the traveling vehicle 31. The left-side wheels 312 roll on the left-side lower rail 11, and the right-side wheels 313 roll on the right-side lower rail 12. These four wheels mainly support the weight of the stacker crane 30.

A motor mounted on the traveling vehicle 31 drives at least one of the wheels so that the stacker crane 30 is self-propelled on the lower rail 10. Further, the vehicle frame 311 is provided with a pair of lower guide rollers 314 which hold the left-side lower rail 11 from the right and left sides of the left-side lower rail 11. The lower guide rollers 314 are each a component for stabilizing the traveling direction of the stacker crane 30. As illustrated in FIG. 3, it is preferable that, as the pair of lower guide rollers 314 which hold the left-side lower rail 11 from the right and left sides of the left-side lower rail 11, two pairs of the lower guide rollers 314 be provided at the front and rear of the traveling vehicle 31.

The masts 32 are each a columnar member that is erected on the vehicle frame 311 and extends in a vertical direction. The stacker crane 30 has the pair of masts 32 each of which is provided at the front and rear of the traveling vehicle 31. An upper frame 34 is provided so as to connect between respective uppermost portions of the pair of masts 32. The upper frame 34 is a member that extends in the Y-axis direction.

Figure 4:
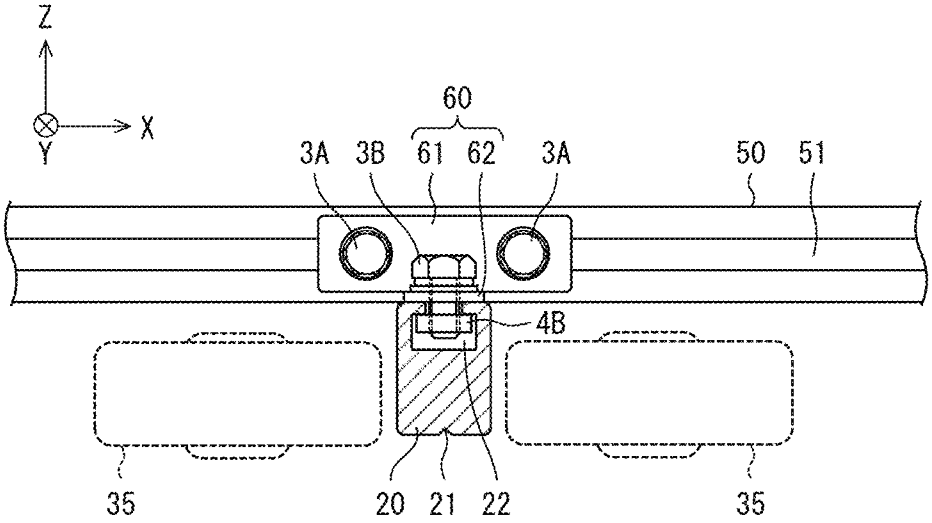
FIG. 4 is a side view illustrating a vicinity of an upper rail in the transport system in accordance with an embodiment of the present disclosure.

Further, a pair of upper guide rollers 35 (guide rollers) capable of rolling on corresponding right and left side surfaces of the upper rail 20 are provided at the uppermost portions of the masts 32. The upper guide rollers 35 are each a component for stabilizing the posture of the traveling stacker crane 30. The pair of upper guide rollers 35 restrict movement of an upper part of the stacker crane 30 in the right direction and the left direction due to the inclination of the stacker crane 30. As illustrated in FIGS. 3 and 4, it is preferable that two pairs of the upper guide rollers 35 be provided at the front and rear of the stacker crane 30.

The raising and lowering section 33 is disposed between the pair of masts 32. The raising and lowering section 33 is capable of moving up and down along the masts 32. Raising and lowering guide rails for guiding the raising and lowering section 33 along the masts are provided as appropriate on corresponding side surfaces of the pair of masts 32 facing each other. The raising and lowering section 33 includes a base 331, raising and lowering frames 332, and a transfer part 333.

The transfer part 333 of the raising and lowering section 33 can pick and place the article C to be transported from the shelf stage 42 of the storage shelf 40A or the storage shelf 40B or from a transport port that is provided as appropriate in the transport system 1. Further, the transfer part 333 can hold the article C being transported.

The base 331 of the raising and lowering section 33 supports the transfer part 333 and houses a drive source, such as a motor, for causing the transfer part 333 to carry out a transfer action. A pair of the raising and lowering frames 332, which are secured to the base 331 and are each provided so as to face a corresponding one of the pair of masts 32, are provided with respective engagement portions (not illustrated) which are engaged with the corresponding raising and lowering guide rails so as to be capable of being raised and lowered.

Provided below the masts 32 is a raising and lowering drive unit (not illustrated) for raising and lowering the raising and lowering section 33 with respect to the masts 32. The raising and lowering frames 332 are configured to be connected to a wire or a belt, which is driven by the raising and lowering drive unit, so that the raising and lowering section 33 can be raised and lowered along the masts 32.

Note that, in the transport system 1, the stacker crane 30 which moves on the track may be a single stacker crane or may be a plurality of stacker cranes. That is, in order to increase the transport capability, the transport system 1 may be configured such that a plurality of stacker cranes 30 move on a common track.

<Overview of Securing of Upper Rail>

Figure 5:
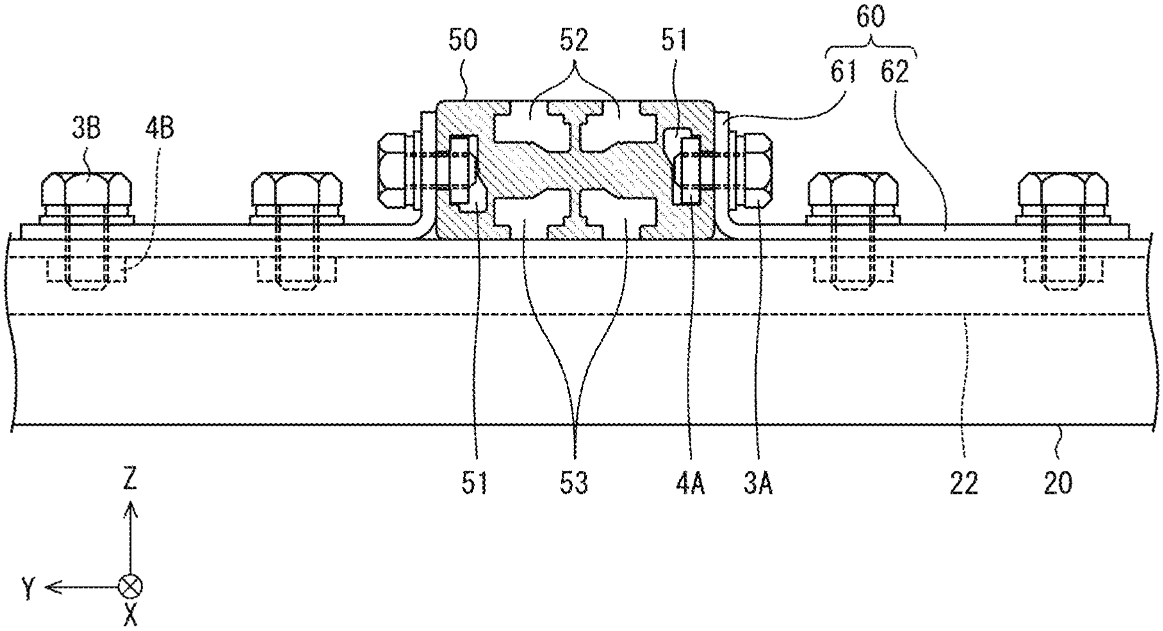
FIG. 5 is an elevation view illustrating the vicinity of the upper rail in the transport system in accordance with an embodiment of the present disclosure.
Figure 6:
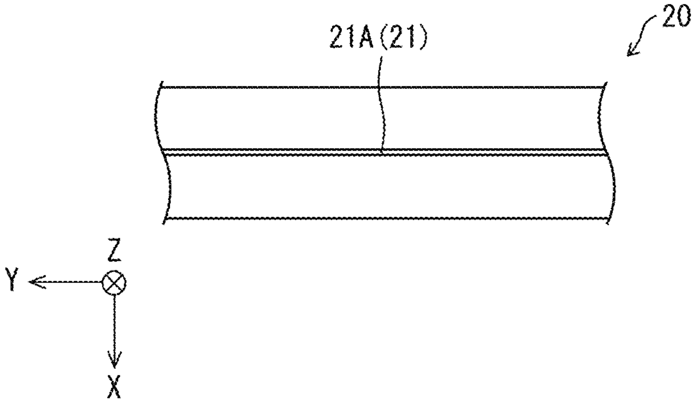
FIG. 6 is a view illustrating an example of a lower surface of the upper rail in the transport system in accordance with an embodiment of the present disclosure.
Figure 7:
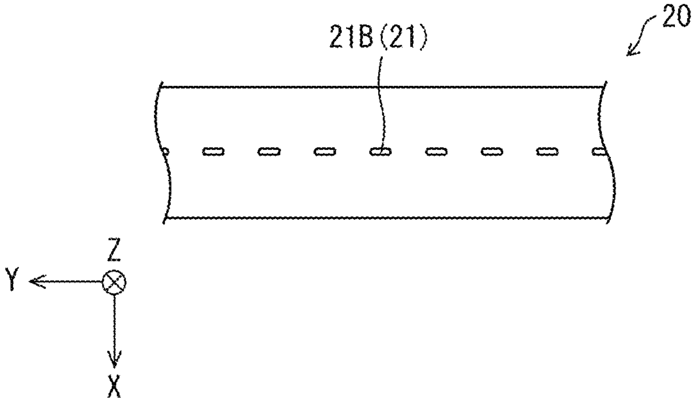
FIG. 7 is a view illustrating an example of the lower surface of the upper rail in the transport system in accordance with an embodiment of the present disclosure.

Next, details of a part of the transport system 1 where the upper rail 20 is secured to the beam part 50 will be described with reference to FIGS. 4 to 7. FIG. 4 and FIG. 5 are a right side view and an elevation view, respectively, illustrating the part where the upper rail 20 is secured to the beam part 50 in an enlarged view. FIG. 6 and FIG. 7 are each a bottom view illustrating a structural example of a lower surface of the upper rail 20.

The upper rail 20 is located below the beam part 50 and is supported by the beam part 50 in such a manner as to be orthogonal to the beam part 50. Here, the upper rail 20 and the beam part 50 are coupled to each other through the attachment part 60. In the present embodiment, the attachment part 60 is a member which is secured to the upper rail 20 with a fastening member.

<Structure of Upper Rail>

FIG. 4 illustrate a cross section of the upper rail 20. In FIG. 4, the upper rail 20 is illustrated as a member with hatching. The upper rail 20 is a columnar member that continuously includes the cross-sectional structure illustrated in FIG. 4 in the longitudinal direction. The upper rail 20 having such a constant cross-sectional structure may be constructed of an extruded material made of, for example, aluminum (Al) as a principal raw material.

The cross section of the upper rail 20 is substantially rectangular in whole. On an upper surface of the upper rail 20, a groove 22, extending in the longitudinal direction, for engaging an engagement member is opened. Here, the engagement member may be a set of a bolt and a nut as a specific example. In this way, the groove 22 for engaging the engagement member is formed on the upper surface of the upper rail 20. Note that, as is known in the art, it is needless to say that a washer is used as appropriate in fastening and securing with a bolt and a nut.

As illustrated in FIG. 4, the groove 22 on the upper surface for engaging the engagement member has a groove width which allows a nut 4B to be inserted in a tilted position in an opening of the groove 22 in the vicinity of the upper surface of the upper rail 20. In addition, the groove 22 has a groove width wider in the back than in the opening and is configured such that the nut 4B into which a shaft of the bolt 3B inserted from the outside of the groove 22 is screwed lies on an upper surface portion of the upper rail 20 on opposite sides of the opening when fastened.

Opposite side surfaces of the upper rail 20 are vertical to the X-axis, and the upper rail 20 is configured such that the pair of upper guide rollers 35 of the stacker crane 30 are capable of rolling on the corresponding opposite side surfaces of the upper rail 20. In FIG. 4, the upper guide rollers 35 are schematically represented by a dotted line, and a positional relationship between the upper guide rollers 35 and the upper rail 20 is illustrated. Since the upper guide rollers 35 roll on the corresponding opposite side surfaces of the upper rail 20, the groove 22 used for securing the upper rail 20 is preferably provided on the upper surface of the upper rail 20 as described above.

On the lower surface of the upper rail 20, a mark 21 is formed. The mark 21 is a mark for clearly representing the position of the upper rail 20 in a direction (X-axis direction) orthogonal to the extending direction of the upper rail 20 in the horizontal plane. In FIG. 4, the mark 21 formed as a recess in the lower surface of the upper rail 20 is schematically represented. Such a mark 21 may be formed as a recess or protrusion provided on the lower surface of the upper rail 20. Alternatively, the mark 21 may be drawn on the lower surface of the upper rail 20.

Examples of the shape of the mark 21 on the lower surface of the upper rail 20 are illustrated in FIGS. 6 and 7. The mark 21A illustrated in FIG. 6 is an example of the mark 21 that is provided on the lower surface of the upper rail 20 and that extends in the longitudinal direction. The shape of the mark 21A is a line shape provided in the center of the lower surface of the upper rail 20. Marks 21B illustrated in FIG. 7 are an example of the mark 21 that is provided on the lower surface of the upper rail 20 and that is arranged in a line in the longitudinal direction. The marks 21B are configured as a broken line provided in the center of the lower surface of the upper rail 20.

<Structure of Beam Part>

FIG. 5 illustrates a cross section of the beam part 50. In FIG. 5, the beam part 50 is illustrated as a member with hatching. The beam part 50 is a columnar member that continuously includes the cross-sectional structure illustrated in FIG. 5 in the longitudinal direction. The beam part 50 having such a constant cross-sectional structure may be constructed of an extruded material made of aluminum as a principal raw material.

The cross section of the beam part 50 is substantially rectangular in whole. On side surfaces of the beam part 50, groove portions 51 that extend in the longitudinal direction of the beam part 50 to which the engagement member is engaged are opened. On an upper surface of the beam part 50, a groove portion 52 that extends in the longitudinal direction of the beam part 50 to which the engagement member can be engaged is opened. As illustrated in FIG. 5, the groove portion 52 on the upper surface of the beam part 50 may be two groove portions. On a lower surface of the beam part 50, a groove portion 53 that extends in the longitudinal direction of the beam part 50 to which the engagement member can be engaged is opened. As illustrated in FIG. 5, the groove portion 53 on the lower surface of the beam part 50 may be two groove portions.

The groove portions 51 provided on the side surfaces of the beam part 50, the groove portion 52 provided on the upper surface of the beam part 50, and the groove portion 53 provided on the lower surface of the beam part 50 each have a configuration similar to the configuration of the groove 22 of the upper rail 20. That is, for example, the groove portions 51 on the side surfaces of the beam part 50 each have a groove width which allows a nut 4A to be inserted in a tilted position in a corresponding one of openings of the groove portions 51 in the vicinity of the side surfaces of the beam part 50.

Further, the groove portions 51 each have a groove width wider in the back than in the opening and are each configured such that the nut 4A into which a shaft of a bolt 3A inserted from the outside of a corresponding one of the groove portions 51 is screwed lies on a corresponding one of side surface portions of the beam part 50 on opposite sides of a corresponding one of the openings when fastened. The groove portions 51 provided on the side surfaces of the beam part 50, the groove portion 52 provided on the upper surface of the beam part 50, and the groove portion 53 provided on the lower surface of the beam part 50 may be used to couple the beam part 50 to the storage shelf 40A or the storage shelf 40B.

<Details of Securing of Upper Rail with Use of Attachment Part>

In the present embodiment, the attachment part 60 in a state of being attached to the beam part 50 is in the shape of the letter T in plan view, that is, when viewed in the vertical direction (Z-axis direction). A first securing portion 61 of the attachment part 60 corresponds to a lateral bar of the letter T, and a second securing portion 62 thereof corresponds to a longitudinal bar of the letter T. The first securing portion 61 is in the form of a plate which abuts on a corresponding one of the side surfaces of the beam part 50. That is, when the attachment part 60 is in the state of being attached to the beam part 50, the first securing portion 61 has a principal surface that is parallel to a Z-X plane.

The second securing portion 62 is in the form of a plate which abuts on the upper surface of the upper rail 20. That is, when the attachment part 60 is in the state of being attached to the beam part 50, the second securing portion 62 has a principal surface that is parallel to the X-Y plane. Thus, as illustrated in FIG. 5, when the attachment part 60 is in a state of being attached to the beam part 50, the attachment part 60 is in the shape of the letter L in elevation view, that is, when viewed in the X-axis direction.

As illustrated in FIGS. 4 and 5, the second securing portion 62 is provided with two through holes for passing the shaft of the bolt 3B therethrough. The attachment part 60 and the upper rail 20 are secured to each other by screwing and fastening the bolt 3B a shaft part of which has been passed through a corresponding one of the through holes of the second securing portion 62 into the nut 4B located inside the groove 22 on the upper surface of the upper rail 20. That is, the attachment part 60 which is secured to the upper rail 20 with the fastening member (the bolt 3B and the nut 4B) is fastened and secured to the beam part 50 with the fastening member (the bolt 3A and the nut 4A), so that the upper rail 20 is supported by the beam part 50.

Since the groove 22 on the upper surface of the upper rail 20 is continuously formed in the longitudinal direction of the upper rail 20, the attachment part 60 can move in the longitudinal direction of the upper rail 20 in a state in which the fastening between the bolt 3B and the nut 4B is slightly loosened. In other words, when the fastening of the attachment part 60 to the upper rail 20 with the fastening member (the bolt 3B and the nut 4B) is loosened, the attachment part 60 is movable in the longitudinal direction of the upper rail 20 in a state in which the fastening member is engaged with the groove 22.

Similarly, the first securing portion 61 is provided with two through holes for passing a shaft part of the bolt 3A therethrough. The attachment part 60 and the beam part 50 are secured to each other by screwing and fastening the bolt 3A the shaft part of which has been passed through a corresponding one of through holes of the first securing portion 61 into the nut 4A located inside the groove portion 51 on the side surface of the beam part 50.

Since the groove portion 51 on the side surface of the beam part 50 is continuously formed in the longitudinal direction of the beam part 50, the attachment part 60 can move in the longitudinal direction (X-axis direction) of the beam part 50 with respect to the beam part 50 in a state in which the fastening between the bolt 3A and the nut 4A is slightly loosened. In other words, when the fastening of the attachment part 60 to the beam part 50 with the fastening member (the bolt 3A and the nut 4A) is loosened, the attachment part 60 is movable in the longitudinal direction of the beam part 50 in a state in which the fastening member is engaged with the groove portion 51.

Thus, in mounting the upper rail 20, the position of the upper rail 20 to be secured to the beam part 50 through the attachment part 60 can be adjusted in the longitudinal direction of the beam part 50. Therefore, with reference to the lower rail 10, adjustment in the X-axis direction of the upper rail 20 can be carried out, and accurate positioning of the upper rail 20 in relation to the lower rail 10 can be easily carried out.

<Overview of Method for Constructing Transport System>

A method for constructing the transport system 1 will be described below. The overview of the method for constructing the transport system 1 is as follows. First, the storage shelf 40A and the storage shelf 40B are mounted on the floor F. In addition, a plurality of beam parts 50 are spanned between the storage shelf 40A and the storage shelf 40B.

The lower rail 10 is laid on the floor F (first step). For smooth traveling of the stacker crane 30, in the first step, the left-side lower rail 11 and the right-side lower rail 12 are constructed such that the respective upper surfaces of the left-side lower rail 11 and the right-side lower rail 12 are horizontally aligned so as to be of the same height. Further, the left-side lower rail 11 and the right-side lower rail 12 constitute respective straight lines and are constructed so as to be parallel to each other. In order to accurately carry out such construction, an appropriate known fixing bracket 13 that allows the position of the lower rail 10 to be adjusted can be used for fixing the lower rail 10 with respect to the floor F (see FIG. 9).

After that, the upper rail 20 is mounted so as to be supported by the beam part 50 as described above (second step). In the second step, the attachment part 60 that is secured to the upper rail 20 in a state in which the attachment part 60 is loosely fastened to the beam part 50 with the fastening member engaged with the groove portion 51 of the beam part 50 is moved in the longitudinal direction (X-axis direction) of the beam part 50. In this way, the position of the upper rail 20 in relation to the lower rail 10 that has been laid in the first step is adjusted.

Here, a mounting position of the upper rail 20 is determined by, with reference to the lower rail 10 that has been laid in the first step, adjusting the position of the mark 21 put on the upper rail 20 in the direction (X-axis direction) that is a horizontal direction and is orthogonal to the extending direction of the lower rail 10. For this adjustment, in the second step, a laser marking device 70 that is capable of forming a linear irradiation line on a ceiling surface by emitting a laser beam in a direction in the vertical plane and an alignment jig 80 that is installed on the lower rail are used.

<Laser Marking Device>

A laser marking device is a device that, by irradiation with a laser beam in a predetermined direction with reference to the direction of gravity, can draw a horizontal irradiation line or a vertical irradiation line on a wall surface of a building or draw, on the ceiling surface, an irradiation line that is an intersection line between the vertical plane and the ceiling surface. In general, such a laser marking device is commercially available and widely used in construction sites and the like of buildings.

Figure 8:
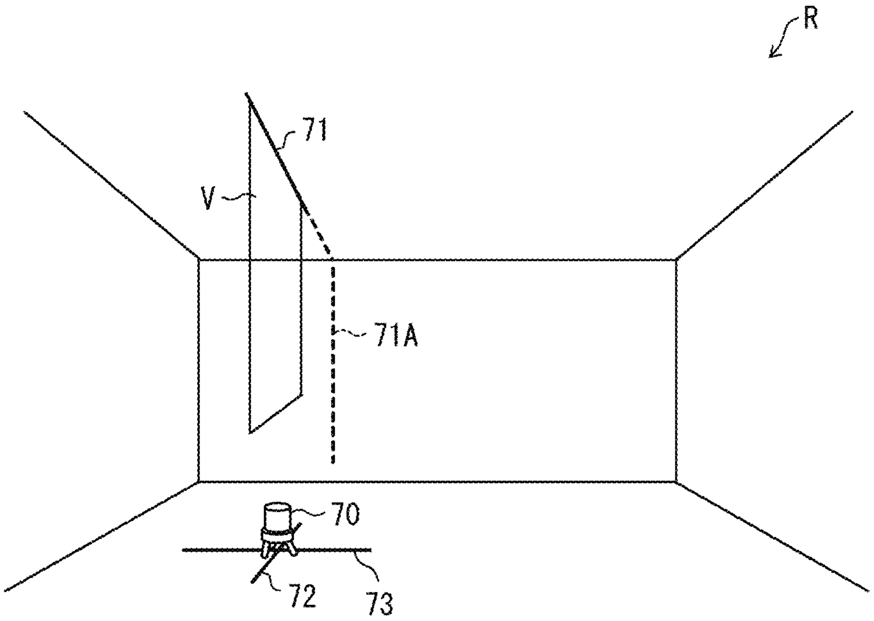
FIG. 8 is a view for describing a function of a laser marking device used in a method for constructing the transport system in accordance with an embodiment of the present disclosure.

FIG. 8 is a view for describing a function of the laser marking device 70 used in the second step in accordance with the present embodiment. FIG. 8 illustrates a situation in which the laser marking device 70 employed in the second step in accordance with the present embodiment is placed on a floor surface of a normal room R in a building and operated. The laser marking device 70 is a device capable of forming a linear irradiation line 71 on a ceiling surface by emitting a laser beam in a direction having an upward angular width in a vertical plane V.

The laser marking device 70 also emits a laser beam in a downward direction in the vertical plane V so as to draw, on the floor surface of the room R, a linear basic reference line 72 for use as a reference for the position of the vertical plane V. Thus, both the radiation line 71 drawn on the ceiling surface of the room R and the basic reference line 72 drawn on the floor surface of the room R are included in the same vertical plane V. That is, the irradiation line 71 drawn on the ceiling surface is located directly above the basic reference line 72 drawn on the floor surface. The irradiation line 71 on the ceiling surface corresponds to an intersection line between the vertical plane V and the ceiling surface of the room R. The basic reference line 72 corresponds to an intersection line between the vertical plane V and the floor surface of the room R.

Minimum functions of the laser marking device 70 as the laser marking device employed in the second step of the method for constructing the transport system 1 in the present embodiment are as described above. However, the laser marking device 70 may have a function of drawing, in addition to the basic reference line 72, a line orthogonal to the basic reference line 72 on the floor surface of the room R as an orthogonal reference line 73. In this case, an intersection of the basic reference line 72 and the orthogonal reference line 73 can also be used as a reference for the position of the laser marking device 70 in a direction along the basic reference line 72.

The laser marking device 70 may be configured to draw a vertical line 71A as an irradiation line on the wall surface of the room R as indicated by a dotted line in FIG. 8 by emitting a laser beam over a wide angle in the upward direction in the vertical plane V. The vertical line 71A corresponds to an intersection line between the vertical plane V and the wall surface of the room R.

<Alignment Jig>

Figure 9:
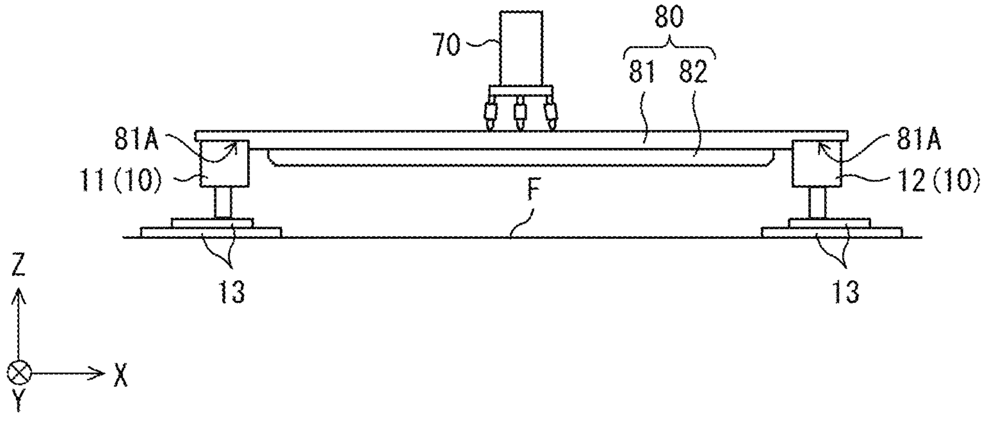
FIG. 9 is a side view of an alignment jig used in the method for constructing the transport system in accordance with an embodiment of the present disclosure.

FIG. 9 is a side view illustrating an alignment jig 80 used in the second step in accordance with the present embodiment. FIG. 9 illustrates a situation in which the alignment jig 80 is installed on the lower rail 10, and the laser marking device 70 is placed on the alignment jig 80.

Figure 10:
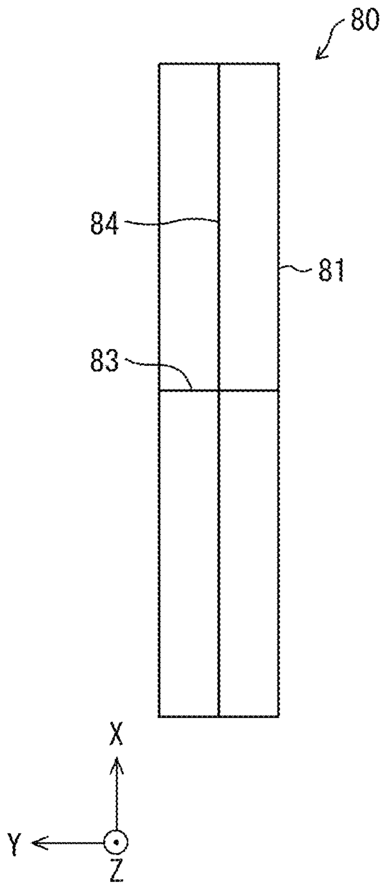
FIG. 10 is a plan view of the alignment jig used in the method for constructing the transport system in accordance with an embodiment of the present disclosure.
Figure 11:
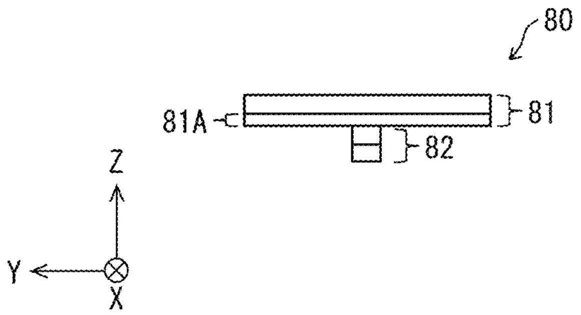
FIG. 11 is an elevation view of the alignment jig used in the method for constructing the transport system in accordance with an embodiment of the present disclosure.

FIG. 10 is a plan view illustrating the alignment jig 80. FIG. 11 is an elevation view illustrating the alignment jig 80. The alignment jig 80 includes a flat plate part 81 and a crosspiece 82. The flat plate part 81 is constituted by a plate material which is to be spanned between the left-side lower rail 11 and the right-side lower rail 12 and which has an upper surface that is planar. The planar shape of the flat plate part 81 is a rectangle shape which is long in the direction (X-axis direction) orthogonal to the extending direction of the lower rail 10 as illustrated in FIG. 10, when the flat plate part 81 is spanned between the left-side lower rail 11 and the right-side lower rail 12.

The flat plate part 81 has respective notches 81A which are provided at opposite end portions of the lower surface thereof and which are to be engaged with the left-side lower rail 11 and the right-side lower rail 12. The notches 81A are configured such that, when the alignment jig 80 is installed on the lower rail 10, the flat plate part 81 is fitted to the left-side lower rail 11 and the right-side lower rail 12 without play in the direction (X-axis direction) orthogonal to the extending direction of the lower rail 10.

The crosspiece 82 is a member, attached to the bottom surface of the flat plate part 81, for reinforcing the flat plate part 81. Providing the crosspiece 82 on the bottom surface of the flat plate part 81 prevents the flat plate part 81 from warping when the alignment jig 80 is spanned between the left-side lower rail 11 and the right-side lower rail 12. The crosspiece 82 extends in the direction (X-axis direction) orthogonal to the extending direction of the lower rail 10 and is preferably attached so as to be located in the center of the flat plate part 81.

As illustrated in FIG. 10, a first reference line 83 is formed on the upper surface of the flat plate part 81. The first reference line 83 of the alignment jig 80 installed on the lower rail 10 is a straight line parallel to the extending direction of the lower rail 10 and is a reference line which serves as a reference for the position of the upper rail 20. Thus, the first reference line 83 is drawn at a predetermined position on the upper surface of the flat plate part 81 according to a positional relationship, defined by the design of the track, between the left-side lower rail 11, the right-side lower rail 12, and the upper rail 20.

For example, in the present embodiment in which the upper rail 20 is located midway between the left-side lower rail 11 and the right-side lower rail 12 in a plan view, the position of the first reference line 83 lies in the center of the alignment jig 80 in the direction (X-axis direction) orthogonal to the extending direction of the lower rail 10. The alignment jig 80 only needs to have at least the first reference line 83 formed thereon. As illustrated in FIG. 10, a second reference line 84 that is orthogonal to the first reference line 83 may be further formed or may be omitted.

The second reference line 84 of the alignment jig 80 installed on the lower rail 10 is a line that is orthogonal to the extending direction of the lower rail 10, that is, a line in the X-axis direction. The first reference line 83 and the second reference line 84 may be formed as a groove on the upper surface of the flat plate part 81 by a method such as scribing, or may be drawn on the upper surface of the flat plate part 81.

<Details of Positioning in the Second Step>

Next, in the second step of the method for constructing the transport system 1, details of a method for positioning the upper rail 20 in relation to the lower rail 10 and mounting the upper rail 20 will be described. First, the alignment jig 80 is installed on the lower rail 10. As illustrated in FIG. 9, in the present embodiment, the alignment jig 80 is set such that the flat plate part 81 is spanned between the left-side lower rail 11 and the right-side lower rail 12.

Thereafter, the laser marking device 70 is placed on the alignment jig 80. The laser marking device 70 is caused to emit a laser beam so that at least the basic reference line 72 is drawn on the alignment jig 80. The laser marking device 70 is adjusted so that the basic reference line 72 formed by the laser marking device 70 and the first reference line 83 formed on the upper surface of the alignment jig 80 coincide with each other. Alternatively, the placement position, angle, and the like of the laser marking device 70 are adjusted for the coincidence.

When the basic reference line 72 formed by the laser marking device 70 and the first reference line 83 formed on the upper surface of the alignment jig 80 coincide with each other, the adjustment of the placement position of the laser marking device 70 on the alignment jig 80 is completed. At this time, the vertical plane V (see FIG. 8) on which the laser marking device 70 emits the laser beam passes through the first reference line 83. As a result, the laser marking device 70 can draw the irradiation line 71 directly above the first reference line 83 and an extension line of the first reference line 83.

In a case where the laser marking device 70 draws the orthogonal reference line 73, the orthogonal reference line 73 may be further used for adjusting the placement position and angle of the laser marking device 70. The second reference line 84 is formed on the upper surface of the flat plate part 81 of the alignment jig 80 so as to be to be longer than the first reference line. Thus, by making adjustment so that the orthogonal reference line 73 and the second reference line 84 coincide with each other, it is possible to more strictly adjust, in a direction of rotation in the horizontal plane, the angle of the vertical plane V where the laser marking device 70 emits a laser beam.

The laser marking device 70 is caused to draw the irradiation line 71, and the mounting position of the upper rail 20 in the X-axis direction is adjusted such that the mark 21 on the lower surface of the upper rail 20 and the irradiation line 71 coincide with each other in a mounting location of the upper rail 20. At this time, the position is adjusted in a state in which, as described above, the fastening of the attachment part 60 to the beam part 50 with the fastening member (the bolt 3A and the nut 4A) is loosened, and the attachment part 60 secured to the upper rail 20 is movable in the longitudinal direction of the beam part 50.

Figure 12:
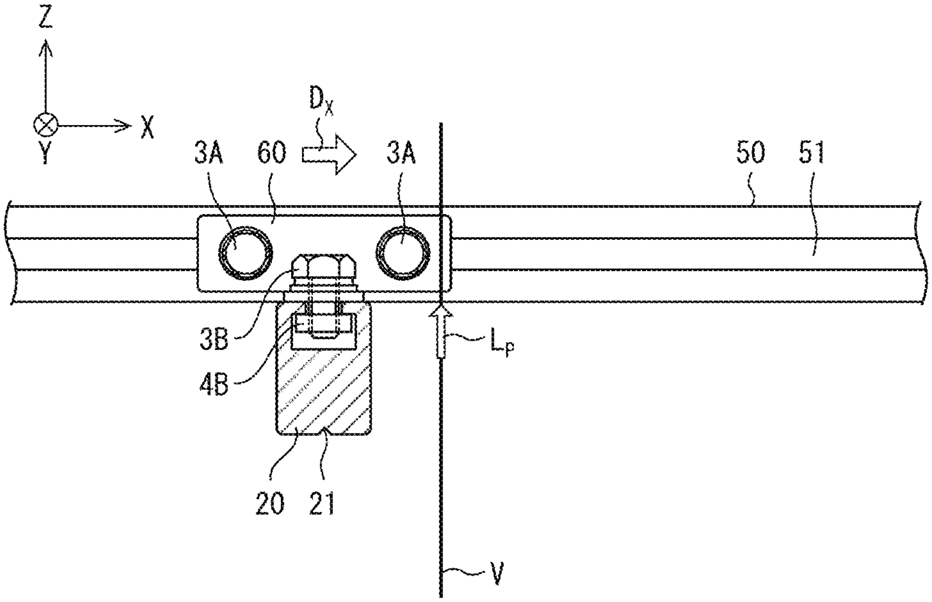
FIG. 12 is a view for describing a second step in the method for constructing the transport system in accordance with an embodiment of the present disclosure.
Figure 13:
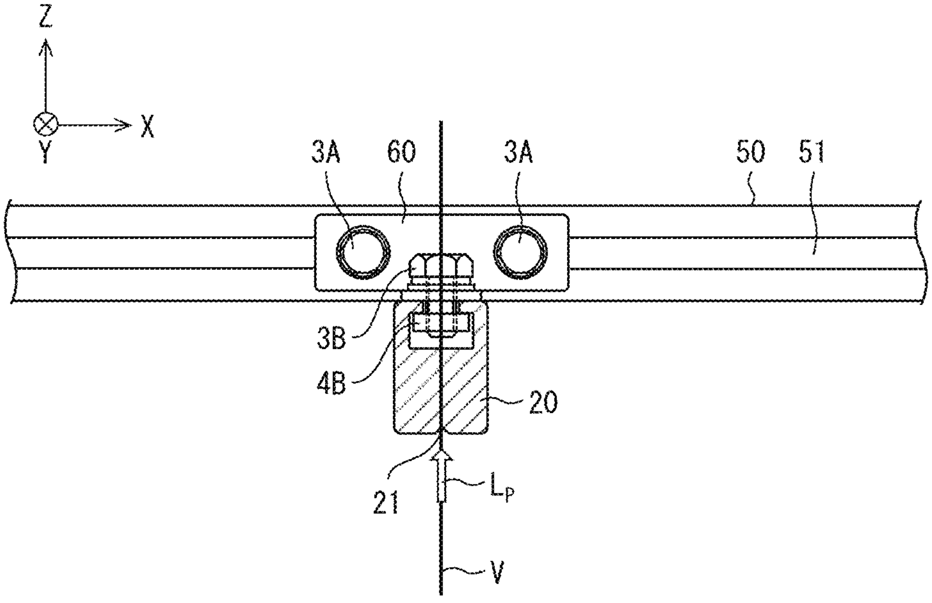
FIG. 13 is a view for describing the second step in the method for constructing the transport system in accordance with an embodiment of the present disclosure.

FIGS. 12 and 13 are views for describing the position adjustment of the upper rail 20 by such a procedure. FIG. 12 illustrates a state in which the upper rail 20 is temporarily secured to the beam part 50 through the attachment part 60 in a state in which the fastening of the attachment part 60 to the beam part 50 with the fastening member (the bolt 3A and the nut 4A) is loosened. In FIG. 12, the vertical plane V passing through the basic reference line 72 of the alignment jig 80 is located so to be displaced in the positive X-axis direction from the mark 21 of the upper rail 20.

In the situation illustrated in FIG. 12, the laser beam emitted by the laser marking device 70 upward in the vertical plane V forms the irradiation line 71 at a position indicated by an arrow Lp on the lower surface of the beam part 50. Thus, an operator can easily recognize that the mark 21 and the position (arrow Lp) where the irradiation line 71 is formed are displaced from each other, and moves the upper rail 20 together with the attachment part 60 in a direction indicated by an arrow Dx in FIG. 12 in the longitudinal direction of the beam part 50.

In this way, the operator adjusts the position of the upper rail 20 so that the position, indicated by the arrow Lp, where the irradiation line 71 is formed coincides with the mark 21 of the upper rail 20 as illustrated in FIG. 13. After that, the operator carries out fastening and securing of the attachment part 60 to the beam part 50 with the fastening member (the bolt 3A and the nut 4A), that is, full tightening, to mount the upper rail 20 at a required position. By carrying out such an operation sequentially from one end of the upper rail 20, it is possible to construct the upper rail 20 that is mounted at an accurate position in relation to the lower rail 10.

According to the present embodiment, the upper rail 20 is mounted, as designed, accurately on the position in the direction (X-axis direction) vertical to the extending direction of the lower rail 10 in the horizontal plane, in relation to the lower rail 10. Thus, the stacker crane 30 guided by the upper rail 20 can travel stably.

The mounting of the upper rail 20 is high-place work, and a burden of the work is significant. Thus, the mounting of the upper rail 20 at an accurate position has involved difficulties. However, according to the present embodiment, the position of the upper rail 20 in the X-axis direction can be adjusted in a state in which the upper rail 20 is suspended from the beam part 50 and temporarily secured to the beam part 50. Further, the mark 21 and the irradiation line 71 enable the operator to easily make a position check at a high place. Therefore, according to the present embodiment, it is possible to realize a method for constructing a transport system that enables accurate construction of an upper rail to be carried out more easily than the conventional method.

[Variations]

Regarding the track of the stacker crane, the lower rail 10 may be constituted by a single rail, without including the configuration in which a plurality of rails are juxtaposed to each other. In this case, the alignment jig is changed so as to have a structure in which the alignment jig is set on the single rail, without straddling the plurality of rails as in the above embodiment.

Presented in the above embodiment is the attachment part 60 which is fastened and secured to the side surface of the beam part 50. However, the configuration of the attachment part is not limited to such a configuration. The attachment part may have a structure in which the attachment part is fastened and secured to the groove portion 52 on the upper surface of the beam part 50 with a fastening member. In this case, instead of the configuration as illustrated in FIG. 5 in which a pair of attachment parts separated in a front-rear direction (Y-axis direction) are attached to the beam part 50, a configuration may be employed in which an integral attachment part that is not separated in the front-rear direction is attached to the beam part 50.

Alternatively, the attachment part 60 may have a structure in which the attachment part 60 is fastened and secured to the groove portion 53 on the lower surface of the beam part 50 with a fastening member. In this case, instead of the configuration as illustrated in FIG. 5 in which a pair of attachment parts separated in a front-rear direction (Y-axis direction) are attached to the beam part 50, a configuration may be employed in which an integral attachment part that is not separated in the front-rear direction is attached to the beam part 50.

In the above embodiment, the attachment part 60 is a member that is different from the upper rail 20 to which the attachment part 60 is secured with the fastening member (the bolt 3B and the nut 4B). However, the configuration of the attachment part is not limited to such a configuration. For example, the attachment part may be secured to the upper rail by welding or the like. Alternatively, the attachment part may be configured as a member that is integral with the upper rail.

Aspects of the present invention can also be expressed as follows:

A transport system in accordance with Aspect 1 of the present disclosure is configured to include: a lower rail for allowing a transport device for transporting an article to travel thereon; an upper rail for guiding the transport device at a position higher than the lower rail; a pair of storage shelves, installed on corresponding opposite sides of the lower rail, for storing the article; a beam part being spanned between the pair of storage shelves; and an attachment part for coupling the upper rail and the beam part to each other, the beam part having a groove portion that allows a fastening member to be engaged therewith and that extends in a longitudinal direction, the upper rail being supported by the beam part when the attachment part is fastened and secured to the beam part with the fastening member.

A transport system in accordance with Aspect 2 of the present disclosure is configured, in Aspect 1 above, such that the attachment part is configured so as to, when the fastening of the attachment part to the beam part with the fastening member is loosened, be movable in the longitudinal direction of the beam part in a state in which the fastening member is engaged with the groove portion.

The transport system in accordance with Aspect 3 of the present disclosure is configured, in Aspect 1 or 2 above, such that the transport device includes at least a pair of guide rollers that are capable of rolling on corresponding opposite side surfaces of the upper rail.

A transport system in accordance with Aspect 4 of the present disclosure is configured, in any one of Aspects 1 to 3 above, such that a mark extending in the longitudinal direction of the upper rail or marks arranged in a line in the longitudinal direction of the upper rail is/are formed on a lower surface of the upper rail.

A method for constructing a transport system in accordance with Aspect 5 of the present disclosure is a method for constructing a transport system, the transport system including: a lower rail for allowing a transport device for transporting an article to travel thereon; an upper rail for guiding the transport device at a position higher than the lower rail; a pair of storage shelves, installed on corresponding opposite sides of the lower rail, for storing the article; a beam part being spanned between the pair of storage shelves; and an attachment part for coupling the upper rail and the beam part to each other, the beam part having a groove portion that allows a fastening member to be engaged therewith and that extends in a longitudinal direction, the upper rail being supported by the beam part when the attachment part is fastened and secured to the beam part with the fastening member, the method including: a first step of laying the lower rail; and a second step of mounting the upper rail, the second step including a sub-step of adjusting the position of the upper rail in relation to the lower rail that has been laid in the first step by moving the attachment part secured to the upper rail in the longitudinal direction of the beam part in a state in which the attachment part is loosely fastened to the beam part with the fastening member engaged with the groove portion.

A method for constructing a transport system in accordance with Aspect 6 of the present disclosure is configured, in Aspect 5 above, such that: a mark extending in a longitudinal direction of the upper rail or marks arranged in a line in the longitudinal direction of the upper rail is/are formed on the upper rail; used in the second step are a laser marking device that is capable of forming a linear irradiation line on a ceiling surface by emitting a laser beam in a direction in a vertical plane and an alignment jig that is installed on the lower rail; the second step further includes a sub-step of installing the alignment jig on the lower rail and a sub-step of placing the laser marking device on the alignment jig that has been installed on the lower rail; and, in the sub-step of adjusting the position of the upper rail, the laser marking device that has been placed on the alignment jig is caused to emit the laser beam from at least in an upward direction in a vertical plane in the longitudinal direction of the lower rail, and the position of the upper rail is adjusted such that the laser beam is brought to a state of being targeted at the mark.

A transport system in accordance with Aspect 7 of the present disclosure is configured, in any one of Aspects 1 to 4 above, such that the attachment part is fastened and secured to a side surface of the beam part with the fastening member.

A transport system in accordance with Aspect 8 of the present disclosure is configured, in any one of Aspects 1 to 4 above, such that the attachment part is secured to an upper surface of the upper rail.

A method for constructing a transport system in accordance with Aspect 9 of the present disclosure is a method for constructing a transport system, the transport system including: a lower rail for allowing a transport device to travel thereon; and an upper rail for guiding the transport device at a position higher than the lower rail, the method including: a first step of laying the lower rail; and a second step of mounting the upper rail, wherein a mark extending in a longitudinal direction of the upper rail or marks arranged in a line in the longitudinal direction of the upper rail is/are formed on the upper rail, and, in the second step, a mounting position of the upper rail is determined by, with reference to the lower rail that has been laid in the first step, adjusting the position of the mark(s) in a direction that is a horizontal direction and is orthogonal to a longitudinal direction of the horizontal and lower rail.

A method for constructing a transport system in accordance with Aspect 10 of the present disclosure is configured, in Aspect 9 above, such that; used in the second step are a laser marking device that is capable of forming a linear irradiation line on a ceiling surface by emitting a laser beam in a direction in a vertical plane and an alignment jig that is installed on the lower rail; and the second step further includes a sub-step of installing the alignment jig on the lower rail and a sub-step of causing the laser marking device that has been placed on the alignment jig installed on the lower rail to emit the laser beam at least in an upward direction in a vertical plane in the longitudinal direction of the lower rail and adjusting a mounting position of the upper rail such that the laser beam is targeted at the mark.

A method for constructing a transport system in accordance with Aspect 11 of the present disclosure is configured, in Aspect 9 or 10 above, such that: a reference line which serves as a reference for the position of the laser beam emitted from the laser marking device is drawn on the upper surface of the alignment jig; and the second step further includes a sub-step of adjusting the vertical plane, which includes a direction in which the laser beam is emitted, with use of the reference line such that the vertical plane is brought into line with the longitudinal direction of the lower rail.

A method for constructing a transport system in accordance with Aspect 12 of the present disclosure is configured, in any of Aspects 9 to 11 above, such that, in the first step, a pair of the lower rails are laid in parallel with each other, and, in the second step, the alignment jig is installed so as to straddle the pair of the lower rails.

A transport system in accordance with Aspect 13 of the present disclosure is configured to include: a lower rail for allowing a transport device for transporting an article to travel thereon; an upper rail for guiding the transport device at a position higher than the lower rail; a pair of storage shelves, installed on corresponding opposite sides of the lower rail, for storing the article; and a beam part being spanned between the pair of storage shelves, wherein the upper rail is supported by the beam part, and a mark extending in the longitudinal direction of the upper rail or marks arranged in a line in the longitudinal direction of the upper rail is/are formed on a lower surface of the upper rail.

The present invention is not limited to the above-described embodiments, aspects, and the like, but can be altered by a skilled person in the art within the scope of the claims. The present invention also encompasses, in its technical scope of the present invention, any embodiment derived by combining technical means disclosed in differing embodiments, aspects, and the like as appropriate.

REFERENCE SIGNS LIST

1: transport system
10: lower rail
11: left-side lower rail
12: right-side lower rail
20: upper rail
21, 21A, 21B: mark
22: groove
30: stacker crane (transport device)
31: traveling vehicle
32: mast
33: raising and lowering section
35: upper guide roller (guide roller)
40A, 40B: storage shelf
50: beam part
51, 52, 53: groove portion
60: attachment part
61: first fixing portion
62: second fixing portion
3A, 3B: bolt (fastening member)
4A, 4B: nut (fastening member)
70: laser marking device
71: irradiation line
72: basic reference line
73: orthogonal reference line
80: jig
81: flat plate part
81A: notch
82: crosspiece
83: first reference line
84: second reference line
C: article
V: vertical plane

The invention claimed is:

1. A transport system comprising:
- a lower rail for allowing a transport device for transporting an article to travel thereon;
- an upper rail for guiding the transport device at a position higher than the lower rail;
- a pair of storage shelves, installed on corresponding opposite sides of the lower rail, for storing the article;
- a beam part being spanned between the pair of storage shelves; and
- an attachment part for coupling the upper rail and the beam part to each other,
- the beam part having a groove portion that allows a fastening member to be engaged therewith and that extends in a longitudinal direction of the beam part,
- the upper rail being supported by the beam part when the attachment part is fastened and secured to the beam part with the fastening member.

2. The transport system according to claim 1, wherein the attachment part is configured in a way, when the fastening of the attachment part to the beam part with the fastening member is loosened, be movable in the longitudinal direction of the beam part in a state in which the fastening member is engaged with the groove portion.

3. The transport system according to claim 1, wherein the transport device includes at least a pair of guide rollers that are capable of rolling on corresponding opposite side surfaces of the upper rail.

4. The transport system according to claim 1, wherein an alignment mark extending in the longitudinal direction of the upper rail or alignment marks arranged in a line in the longitudinal direction of the upper rail is/are formed on a lower surface of the upper rail.

5. A method for constructing a transport system, the transport system comprising:
- a lower rail for allowing a transport device for transporting an article to travel thereon;
- an upper rail for guiding the transport device at a position higher than the lower rail;
- a pair of storage shelves, installed on corresponding opposite sides of the lower rail, for storing the article;
- a beam part being spanned between the pair of storage shelves; and
- an attachment part for coupling the upper rail and the beam part to each other, the beam part having a groove portion that allows a fastening member to be engaged therewith and that extends in a longitudinal direction of the beam part, the upper rail being supported by the beam part when the attachment part is fastened and secured to the beam part with the fastening member, the method comprising:

laying the lower rail; and mounting the upper rail, wherein mounting the upper rail includes adjusting a position of the upper rail in relation to the lower rail that has been laid by moving the attachment part secured to the upper rail in the longitudinal direction of the beam part in a state in which the attachment part is loosely fastened to the beam part with the fastening member engaged with the groove portion that extends in the longitudinal direction of the beam.

* * * * *